United States Patent [19]
Kardach

[11] Patent Number: 6,125,450
[45] Date of Patent: *Sep. 26, 2000

[54] STOP CLOCK THROTTLING IN A COMPUTER PROCESSOR THROUGH DISABLING BUS MASTERS

[75] Inventor: James P. Kardach, Saratoga, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/770,715

[22] Filed: Dec. 19, 1996

[51] Int. Cl.$^7$ ............................................. G06F 1/26
[52] U.S. Cl. ...................... 713/323; 713/320; 713/322; 713/324
[58] Field of Search ................... 395/750.05, 750.06, 395/750.04, 293, 750.03; 364/707; 713/320, 324, 322, 323

[56] References Cited

U.S. PATENT DOCUMENTS

| | | |
|---|---|---|
| 5,535,400 | 7/1996 | Belmont . |
| 5,630,145 | 5/1997 | Chen ................................. 395/750.03 |
| 5,652,895 | 7/1997 | Poisner . |
| 5,669,003 | 9/1997 | Carmean et al. . |
| 5,740,454 | 4/1998 | Kelly et al. ........................ 395/750.03 |

Primary Examiner—Ayaz R. Shenkh
Assistant Examiner—Rupal D. Dharia
Attorney, Agent, or Firm—Blakely, Sokoloff, Taylor & Zafman, LLP

[57] ABSTRACT

Microprocessors are often used in portable equipment that run on battery power. Thus, microprocessors used in such environments should save power when ever possible. Processors that have internal cache memories and allow external bus masters present a difficult case. Such processor's cannot enter a low power state since an external bus master may attempt to access a memory location that is represented in the internal cache. The present invention introduces a method and apparatus for allowing a processor having an internal cache to enter a low power state even though there may be other bus masters. A bus idle timer or an operating system monitors the bus to determine if the system bus is idle. When the system bus is idle, a bus arbiter is disabled to prevent bus activity. The processor then enters the low power state. When there is an interrupt caused by an external bus master, the processor is awaked from the low power state and the bus arbiter is re-enabled such that future bus transactions can occur.

20 Claims, 4 Drawing Sheets

STOP CLOCK THROTTLING IN A COMPUTER PROCESSOR THROUGH DISABLING BUS MASTERS

FIELD OF THE INVENTION

The present invention relates to the field of computer processors. In particular the present invention discloses method and apparatus for throttling a processor by disabling bus masters.

BACKGROUND OF THE INVENTION

Computers have become ubiquitous tools of modern society. Most white collar works now work directly with a personal computer system. In order to increase the availability of computer resources, portable personal computer systems have been created. Portable personal computer systems operate on battery power and thus enable a user to use the portable personal computer in locations where traditional AC power is not available.

An electric battery can only store a limited amount of power. Once the available battery power is depleted, the user of the portable personal computer system must find a traditional AC power line to recharge the batteries. Thus, to extend the operational time, it is desirable to use the available battery power in the most efficient manner possible.

To conserve power, many processors implement various low power states. Thus, when a computer system senses that the computer is idle, the computer processor enters a low power state. When the processor is In a lower power state, the processor uses less energy than when the processor is in a normal active state.

If a computer system allows multiple bus masters and the processor in that computer system has an internal cache memory, then a special problem is presented when implementing a processor low power states. In a computer system with multiple bus masters, other peripherals coupled to the bus can control the bus and thus initiate bus transactions. For example, a hard disk control card may become a bus master and write information into a block of main memory. If the computer processor in the preceding example has copies of the block of main memory in the processor's internal cache, then the processor would have to invalidate such internal cache entries. Thus, a processor with an internal cache memory system must snoop bus transactions. Since the processor must snoop bus transactions, the processor cannot enter a fully suspended low power state.

It would therefore be desirable to implement a computer system that allows multiple bus masters wherein the processor has an internal cache memory and the processor can enter a low power state without snooping the bus.

SUMMARY OF THE INVENTION

The present invention introduces a method and apparatus for allowing a processor having an internal cache to enter a low power state even though there may be other bus masters. A bus idle timer or an operating system monitors a bus to determine if the system is idle. When the system is idle, a bus arbiter is disabled to prevent bus activity. The processor then enters the low power state. When there is an interrupt, the processor is awaked from the low power state and the bus arbiter is enabled such that future bus transactions can occur.

Other objects feature and advantages of present invention will be apparent from the accompanying drawings and from the following detailed description that follows below.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for implementing a processor with a suspended state in a bus mastered computer system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the Peripheral Component Interface (PCI) bus. However, the same techniques can easily be applied to other types of Multi-master bus systems.

A Computer System with Multiple Bus Masters

Figure 1:
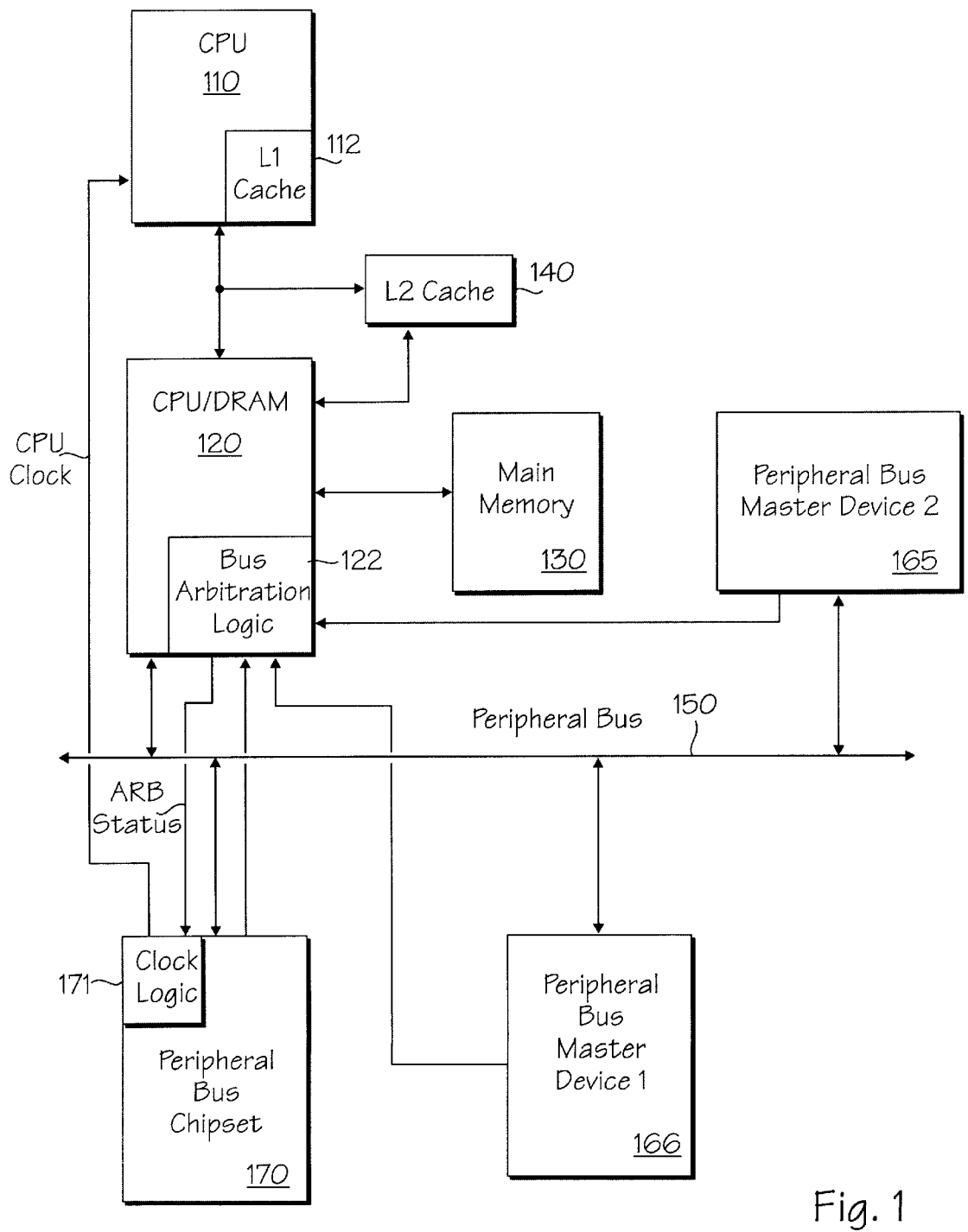
FIG. 1 illustrates one embodiment of a a computer system with multiple bus masters.

FIG. 1 illustrates a computer system that has a computer bus 150 that can be controlled (mastered) by more than one device coupled to the bus. In the example of FIG. 1, a processor 110 with an internal level one (L1) cache 112 is coupled to a peripheral bus 150 through a CPU/DRAM Bus bridge 120.

The CPU/DRAM Bus bridge 120 controls a level two (L2) cache 140 and the main memory 130 for the computer system. The CPU/DRAM Bus bridge 120 also implements bus arbitration logic 122 that allows the various bus nodes to become the bus master.

Also coupled to the peripheral bus 150 is a peripheral bus chipset 170. The peripheral bus chipset 170 works with the Bus Arbitration Logic 122 to implement the functions of the peripheral bus 150.

Finally, two peripheral bus devices, Peripheral Bus Master Device 1 (166) and Peripheral Bus Master Device 2 (165), are coupled to the peripheral bus 150. Each peripheral bus device may become the peripheral bus master by making a request to the bus arbitration logic 122 and then receiving a bus grant (For example GNT[0–21]).

Low Power States in a Computer System with Multiple Bus Masters

Referring to the computer system of FIG. 1, a peripheral device may read or write the main memory 130 through the peripheral bus 150. However, sections of the main memory 130 may be located in a level one (L1) cache 112 (the internal "on-chip" cache). Thus, any reading or writing to the main memory 130 must be snooped by the processor 110 in order to maintain cache consistency.

Since any reading or writing to the main memory 130 must be snooped by the processor 110 in order to maintain cache consistency, it becomes very difficult to put the processor 110 into a low power state. Two existing techniques are used to solve the problem: (1) Cache Flushing; and (2) Low Power snoop states.

A first method of allowing the processor 110 in a computer system with multiple bus masters to enter a low power state is to force the processor 110 to flush its level one (L1) cache 112 into main memory before ever entering a low power state. This method is rather simple, however, it does not provide an ideal solution. One problem with the flushing technique is that not all processors have a cache flush feature. The main problem with flushing the level one (L1) cache 112 before ever entering a low power state is that it is a slow procedure. To effectively implement a processor lower power state, the processor must enter the low power state quickly and transparently. The time required to flush the cache would interfere with normal processing.

Another method of implementing processor low power states in a computer system with multiple bus masters is to create a low power snoop state for the processor 110. In the low power snoop state, the processor ceases to provide power to several logic areas, however, the processor continues to snoop the bus activity to see if any cached memory locations are accessed. If a cached area of memory is accessed, then the processor may awake from the low power state or simply respond to the cached memory access appropriately. Although low power snoop states do succeed in reducing the power consumed by the processor, a processor in such a low power snoop states still consumes a relatively large amount of power. Thus, it would be very desirable to implement a method of allowing the processor to enter a fully suspended state and yet ensure that activity from bus masters is allowed.

Stop Clock State in a Computer System with Multiple Bus Masters

To maximize battery power conservation, the present invention introduces circuitry for a Stop Clock state for a processor in a Computer System with Multiple Bus Masters. The processor will not enter the Stop Clock state unless it has been determined that the bus is idle. If bus activity is detected after the processor has entered the Stop Clock state, the processor will be returned to an active state such that the bus activity can be snooped.

Figure 2:
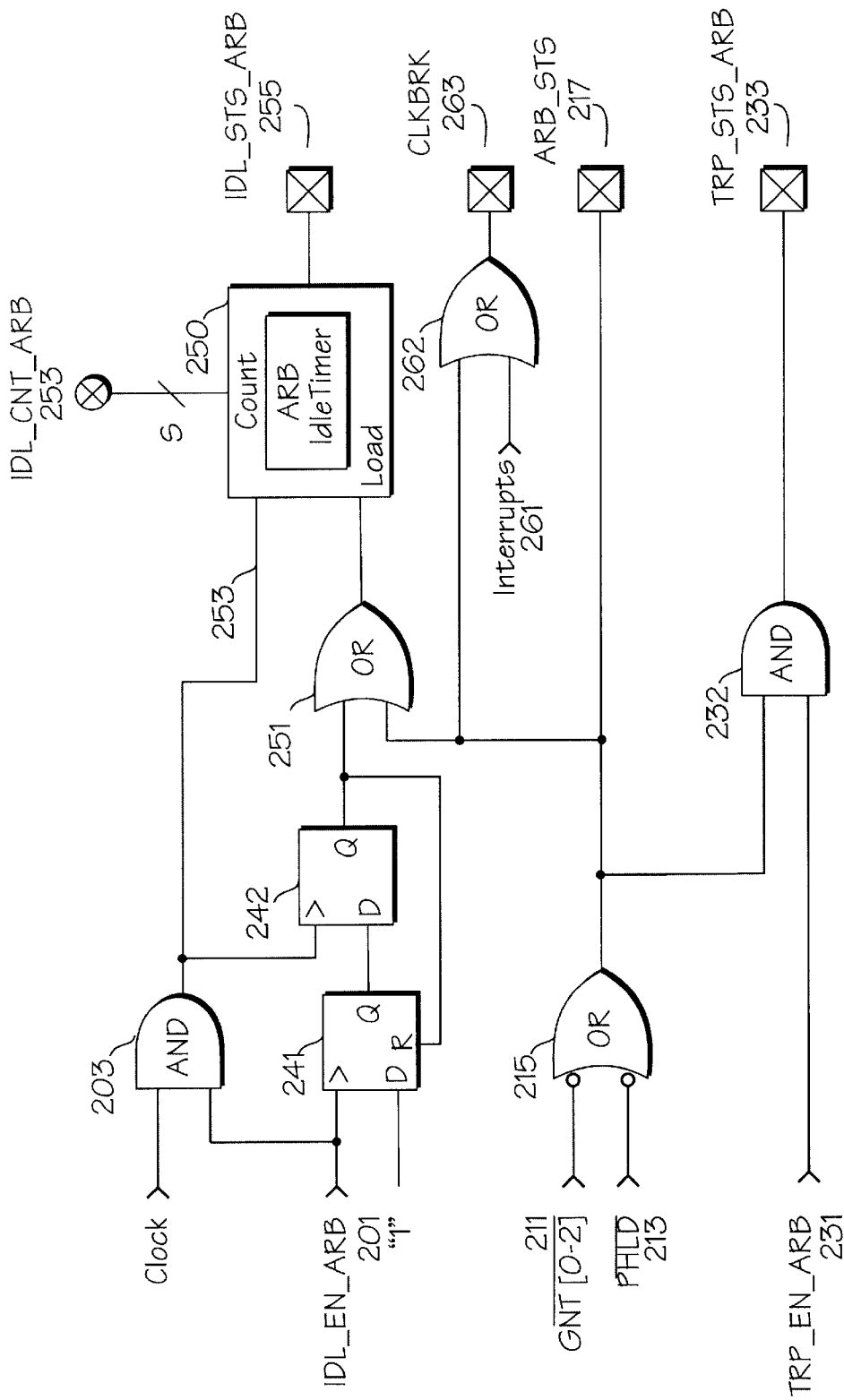
FIG. 2 illustrates a circuit that implements a bus master idle counter counter and related logic.

FIG. 2 illustrates a block circuit diagram of the relevant aspects of the circuitry to help implement a Stop Clock state for a processor in a Computer System with Multiple Bus Masters. Referring to FIG. 2, the main component of the circuitry is an Arbitration Idle Timer 250 that is used to determine if the bus is idle. The Arbitration Idle Timer 250 begins counting when it is signaled on its "Load" input line from OR gate 251. The Arbitration Idle Timer 250 counts clock cycles if the circuit is enabled by an Idle Enable Arbitration line (IDL_EN_ARB) 201 that is logically ANDed with the clock signal. If the Arbitration Idle Timer 250 counts up to a predetermined Idle Count value on the IDL_CNT_ARB lines 252 then the Arbitration Idle Timer 250 indicates that the bus is idle by asserting an Idle Status line (IDL_STS_ARB) 255.

If at any time while the Arbitration Idle Timer 250 is counting the bus is granted as indicated by the bus grant lines (GNT[0–2]) 211 or the PHLD line 213 is asserted, then the Arbitration Idle Timer 250 will restarting its counting. Thus, the idle time counter restarts when it detects any bus activity. If the system was in a stop clock state, the activation of the bus grant lines (GNT[0–2]) 211 or the PHLD line 213 is also used to drive a Clock Break (CLKBRK) line 263. The Clock Break (CLKBRK) line 263 wakes up the processor from the stop clock state. The Clock Break (CLKBRK) line 263 is also driven by any interrupt 261 that the processor receives.

The bus grant lines (GNT[0–2]) 211 and the PHLD line 213 are also used to implement an arbitration status bit (ARB_STS) 217. The arbitration status bit (ARB_STS) 217 is a "sticky bit" that remains set for a certain amount of time after it has been set. Eventually, the arbitration status bit (ARB_STS) 217 clears itself.

Finally, the bus grant lines (GNT[0–2]) 211 and the PHLD line 213 are also logically ANDed with a Trap Enabled Arbitration line (TRP_EN_ARB) 231 to generate a Trap Status Arbitration line (TRI_STS_ARB) 233. The Trap Status Arbitration line (TRP_STS_ARB) 233 is used to disable a microprocessor routine that traps arbitration requests.

In the present embodiment, the circuitry for a microprocessor Stop Clock state can be used in two different manners. Specifically, the microprocessor Stop Clock state can be used with operating system support or the microprocessor Stop Clock state can be used without operating system support. If the microprocessor Stop Clock state is used without operating system support, it should do so in a manner that is transparent to the operating system. The two different methods of implementing the microprocessor Stop Clock state will be described individually.

Stop Clock State With Operating System Support

Figure 3:
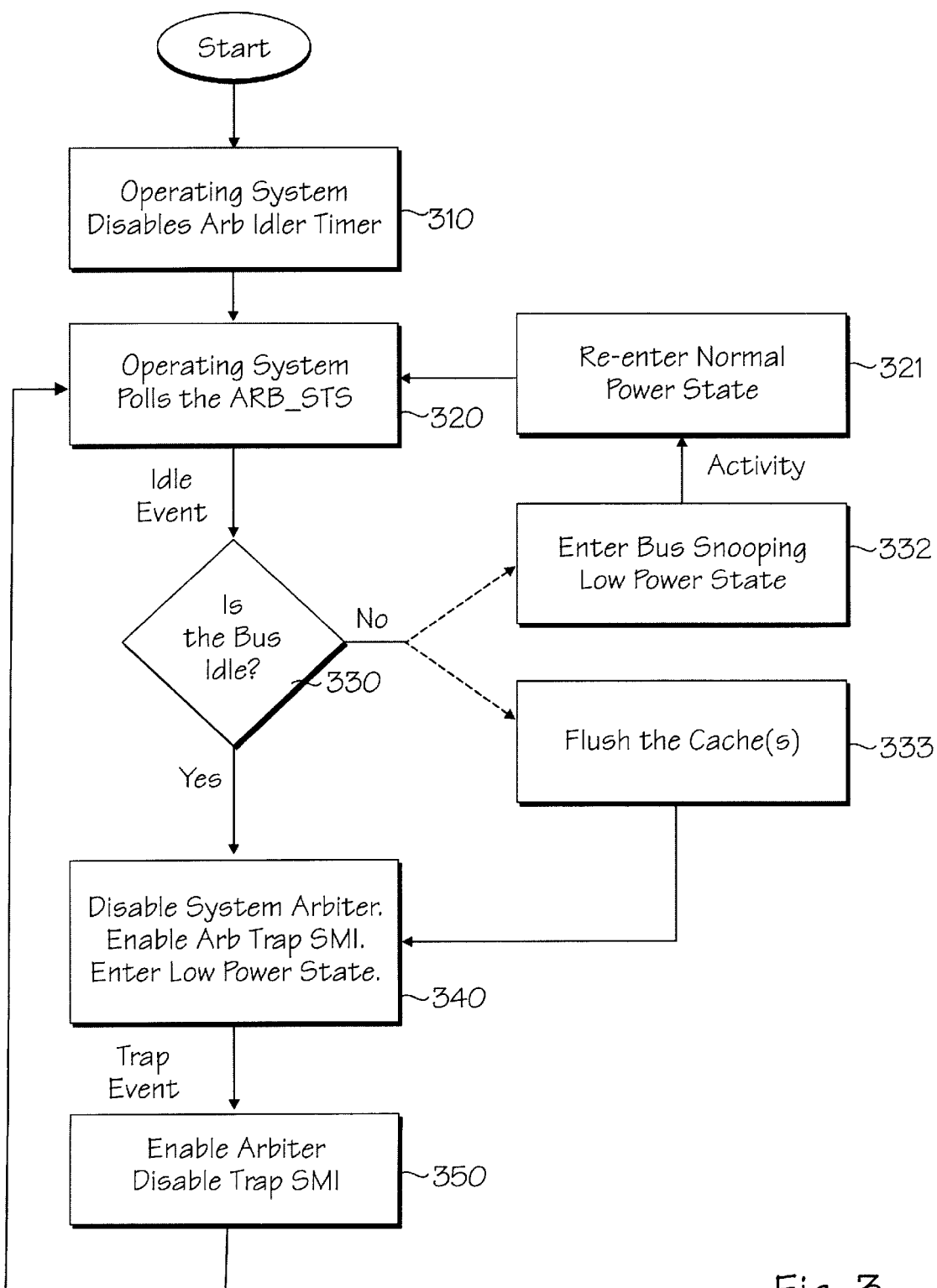
FIG. 3 illustrates an operating system supported method of entering a low powered state in a computer system with multiple bus masters.

FIG. 3 illustrates a flow chart that describes how the microprocessor Stop Clock state operate when there is operating system support. When the microprocessor Stop Clock state is implemented with operating system support, maximum power savings should occur with minimal user interruption since the operating system has the best information to decide when to put the microprocessor into the Stop Clock state.

Referring to FIG. 3, in step 310 the Operating System disables the Arbitration Idle Timer. The Operating System disables the Arbitration Idle Timer since the Operating System will make the decision of when the bus is idle. Next, at step 320, the Operating System determines if the system is idle. The Operating System can use any means it desires to determine when the system is idle including periodically polling the Arbitration Status sticky bit (ARB_STS) 217 to determine if the bus grant lines (GNT[0–2]) 211 or the PHLD line 213 have been activated lately.

When the Operating System determines that the computer system is idle, the system proceeds to step 330 where the Operating System determines if the bus is idle. If there is still activity on the bus, then the Operating System cannot allow the processor to enter the Stop Clock state since the bus activity may require information stored within the processor's internal cache memory. FIG. 3 illustrates two possible actions that the Operating System may take. The Operating System may have the processor enter a bus snooping low power state as illustrated in step 332. In the bus snooping low power state, any bus activity that concerns the processor will awake the process as stated in step 321. Another action that the Operating System may take when the computer system is idle but the bus is still active is to flush the internal cache. Once the internal cache has been flushed, the processor may then enter the Stop Clock state at step 340 since all the information that was in the internal caches is now available in the main memory.

Referring back to step 330, if the operating system determines that the bus is idle, then it proceeds to step 340 to enter the stop clock state. At step 340, the Operating System first disables the Bus System Arbiter such that the Arbiter will not respond to bus requests. The Operating System also enables the an Arbitration Trap System Management Interrupt (SMI) routine. After performing these two functions, the processor may then enter the Stop Clock state such that power is conserved. The processor will remain in the Stop Clock state until the Clock Break signal (CLKBRK) 263 is asserted thus causing a trap event.

In the present embodiment, the Arbitration Trap System Management Interrupt (SMI) routine is implemented using the System Management Mode (SMM) of the Intel® microprocessor line. The System Management Mode allows the processor to execute code in a manner that is completely transparent to the other software that the microprocessor was executing including the Operating System. The Arbitration Trap System Management Interrupt (SMI) routine is designed to bring the processor back into a fully operational state once a trap event occurs that requires the processor's attention.

Referring to step 350, when a trap event occurs, the Arbitration Trap System Management Interrupt (SMI) routine will be invoked. The Arbitration Trap System Management Interrupt (SMI) routine first enables the Bus System Arbiter such that the Bus System Arbiter will once again respond to bus requests. Furthermore, the Arbitration Trap System Management Interrupt (SMI) routine will disable itself. At this point the processor is fully operational and returns to step 320 for normal processing.

Stop Clock State Without Operating System Support

Not all operating systems will cooperating with the circuitry for implementing a Stop Clock state. In particular, existing Operating Systems that were written before the Stop Clock state circuitry existed will not help in determining when the Stop Clock state should be invoked. In such systems, the Stop Clock state circuitry can still be used although the power savings that occur will not likely be as great as in systems wherein the Operating System cooperates.

Figure 4:
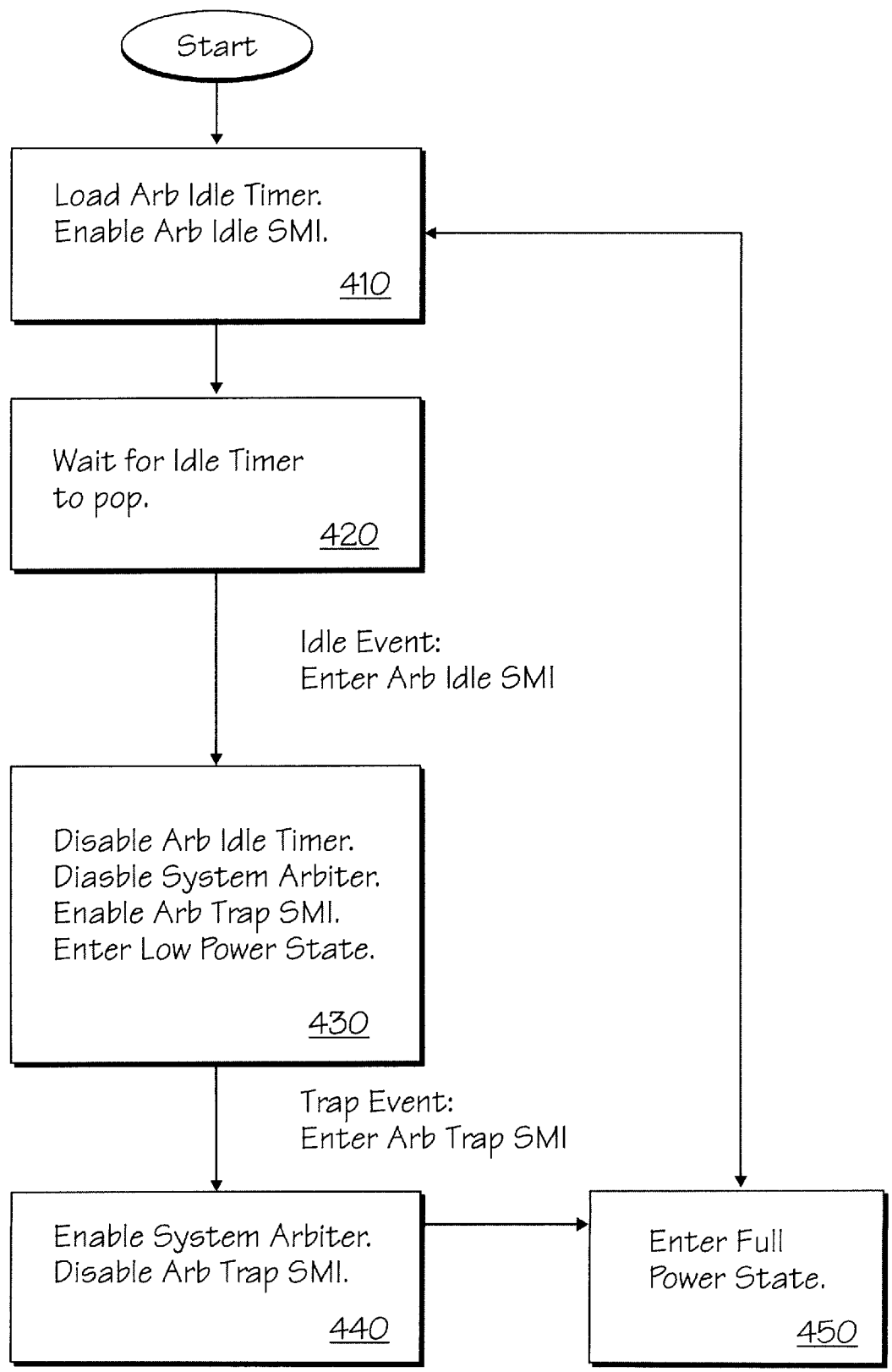
FIG. 4 illustrates an operating system independent method of entering a low powered state in a computer system with multiple bus masters.

Referring to FIG. 4, in step 410 the Arbitration Idle Timer is loaded and the Arbitration Idle System Management Interrupt (SMI) routine is enabled. These steps are performed by the circuitry that support the Stop Clock state. The processor then operates normally as specified in step 420. While the processor is operating, the Arbitration Idle Timer 250 is constantly trying to count up to the amount specified in the Idle Count Arbitration value (IDL_CNT_ARB) 252. When the Arbitration Idle Timer 250 reaches that amount, the Arbitration Idle Timer 250 is said to have "popped" and the Arbitration Idle System Management Interrupt (SMI) routine is invoked at step 430. The Arbitration Idle System Management Interrupt (SMI) routine is transparent to application programs and the operating system.

The Arbitration Idle System Management Interrupt (SMI) routine performs a number of functions. The Arbitration Idle System Management Interrupt (SMI) routine first disables the Arbitration Idle Timer 250 so that it will not pop again. The Arbitration Idle System Management Interrupt (SMI) routine then disables the System Arbiter such that bus requests will be ignored. Finally, the Arbitration Idle System Management Interrupt (SMI) routine disables itself and instead enables the Arbitration Trap System Management Interrupt (SMI) routine. At this point the processor can enter the very low power Stop Clock state. The processor will remain in the Stop Clock state until the Clock Break signal (CLKBRK) 263 is asserted thus causing a trap event.

Referring to step 440, when a trap event occurs, the Arbitration Trap System Management Interrupt (SMI) routine will be invoked. The Arbitration Trap System Management Interrupt (SMI) routine first enables the Bus System Arbiter such that the Bus System Arbiter will once again respond to bus requests. Furthermore, the Arbitration Trap System Management Interrupt (SMI) routine will disable itself. At this point the processor moves to step 450 and enters the fully powered state. Finally, the method returns to step 410 to set up the system to look for another idle time.

The foregoing has described stop clock throttling for a computer processor in a computer system with multiple bus masters. It is contemplated that changes and modifications may be made by one of ordinary skill in the art, to the materials and arrangements of elements of the present invention without departing from the scope of the invention. For example, in the present embodiment, the system has been described with reference to Intel Architecture processors. However, other processors with transparent interrupt routines can also implement the Stop Clock state.

We claim:

1. In a computer system, a method of conserving power in a processor having a cache memory that maps into a main memory, said method comprising:
   monitoring a multiple master bus in said computer system to determine when said multiple master bus is idle, said multiple master bus having multiple bus masters that may initiate bus transactions, said monitoring includes an operating system (OS) polling a status bit, said status bit indicating if said bus has been active within a predetermined period of time;
   in response to said bus having been active within a predetermined period of time, causing said processor to enter a bus snooping low power state;
   in response to said bus having been inactive within a predetermined period of time, disabling a bus system arbiter coupled to said multiple master bus when said multiple master bus is idle to prevent bus transactions initiated by said bus masters that may write to said main memory thus cause cache incoherency;
   causing said processor to enter a processor low power state after disabling said bus system arbiter;
   waking said processor from said processor low power state when a bus master initiates activity on said multiple master bus; and
   enabling said bus system arbiter from said processor to allow bus transactions after waking said processor.

2. The method as claimed in claim 1 wherein monitoring a bus in said computer system with an operating system comprises monitoring bus grant signals on said multiple master bus.

3. The method as claimed in claim 1 wherein waking said processor fro m said processor low power state comprises executing a second trap routine when bus activity is detected on said multiple master bus.

4. The method as claimed in claim 3 wherein executing said second trap routine comprises executing a System Managemnent Interrupt (SMI) routine.

5. The method as claimed in claim 3 further comprising:
   disabling said second trap routine after returning from said processor low power state.

6. The method as claimed in claim 1 wherein counting a number of consecutive clock cycles during which a multiple master bus in said computer system is not active comprises monitoring bus grant signals on said multiple master bus.

7. The method as claimed in claim 1 wherein disabling a bus system arbiter when said bus is idle comprises having said processor execute a first trap routine when multiple master bus is idle.

8. The method as claimed in claim 7 wherein said first trap routine comprises a System Management Interrupt (SMI) routine.

9. The method as claimed in claim 7 wherein waking said processor from said processor low power state comprises executing a second trap routine when bus activity is detected on said multiple master bus.

10. The method as claimed in claim 9 wherein said second trap routine comprises a System Management Interrupt (SMI) routine.

11. The method as claimed in claim 9 further comprising:
disabling said second trap routine after waking said processor from said processor low power state.

12. A computer apparatus, said apparatus comprising:
a main memory;
a computer processor, said computer processor having a cache memory that maps into said main memory;
a computer bus coupled to said main memory, said computer bus having more than one bus master;
a bus arbiter; said bus arbiter arbitrating said computer bus between said bus masters;
a bus idle detector, said bus idle detector detecting when said bus is idle, said bus idle detector includes an operating system (OS) polling a status bit, said status bit indicating if said bus has been active within a predetermined period of time;
a low power routine for said processor, said lower power routine for turning off said bus arbiter to prevent bus master initiated transactions that may write to said main memory causing cache incoherency and forcing said computer processor into a low power state when said bus idle detector detects that said computer bus is idle, and causing said processor to enter a bus snooping low power state when said bus idle detector detects said bus is not idle; and
a bus activity detector, said bus activity detector waking said computer processor when a bus master initiates activity on said computer bus and causing said bus arbiter to be turned back on.

13. The apparatus as claimed in claim 12 wherein said bus activity detector comprises a clock break signal, said clock break signal awaking said computer processor from said low power state when said computer bus is active.

14. The apparatus as claimed in claim 12 wherein said bus idle detector comprises an operating system routine.

15. The apparatus as claimed in claim 12 wherein said bus idle detector comprises a bus idle timer.

16. The apparatus as claimed in claim 12 wherein said bus idle detector monitors bus grant signals.

17. The apparatus as claimed in claim 14 wherein said operating system routine monitors a sticky bit set by bus grant signals.

18. In a computer system, a method of conserving power in a processor having a cache memory that maps into a main memory, said method comprising:
monitoring said computer system from an operating system (OS) to determine if said computer system is idle;
when said computer system is determined to be idle, testing a multiple master bus in said computer system to determine if said multiple master bus is idle, said multiple master bus having multiple bus masters that may initiate bus transactions, said testing includes the OS polling a status bit, said status bit indicating if said bus has been active within a predetermined period of time;
entering a processor snooping low power state when said computer system is idle but said multiple master bus is not idle; and
entering a processor stop clock state when said computer system is idle and said multiple master bus is idle.

19. The method as claimed in claim 18 wherein entering a processor stop clock state comprises:
disabling a bus system arbiter coupled to said multiple master bus when said multiple master bus is idle to prevent bus transactions initiated by said bus masters that may write to said main memory thus cause cache incoherency;
forcing said processor to enter a processor low power state after disabling said bus system arbiter.

20. The method as claimed in claim 19 further comprising:
waking said processor from said processor low power state when a bus master initiates activity on said multiple master bus; and
enabling said bus system arbiter from said processor to allow bus transactions after waking said processor.

* * * * *

UNITED STATES PATENT AND TRADEMARK OFFICE
CERTIFICATE OF CORRECTION

PATENT NO.   : 6,125,450
DATED        : September 26, 2000
INVENTOR(S)  : Kardach It is certified that error appears in the above-identified patent and that said Letters Patent is hereby corrected as shown below:

Column 1,
Line 30, delete "In", insert -- in --.

Column 2,
Line 6, after "one embodiment of", delete "a".

Column 4,
Line 14, delete "TRI_STS_ARB", insert -- TRP_STS_ARB --.

Column 6,
Line 57, delete "fro m", insert -- from --.

Signed and Sealed this

Eighteenth Day of June, 2002

Attest:

JAMES E. ROGAN
Attesting Officer        Director of the United States Patent and Trademark Office